United States Patent
Hall et al.

(10) Patent No.: US 9,617,796 B2
(45) Date of Patent: Apr. 11, 2017

(54) CABLE MANAGEMENT SYSTEM

(71) Applicant: ELECTRO MECHANICAL INDUSTRIES, INC., Houston, TX (US)

(72) Inventors: Joshua Carl Hall, Houston, TX (US); Iryna Ilyk, Houston, TX (US)

(73) Assignee: ELECTRO MECHANICAL INDUSTRIES, INC., Houston, TX (US)

(*) Notice: Subject to any disclaimer, the term of this patent is extended or adjusted under 35 U.S.C. 154(b) by 95 days.

(21) Appl. No.: 14/506,361

(22) Filed: Oct. 3, 2014

(65) Prior Publication Data
US 2015/0096952 A1  Apr. 9, 2015

Related U.S. Application Data

(60) Provisional application No. 61/887,051, filed on Oct. 4, 2013.

(51) Int. Cl.
*H02G 3/04* (2006.01)
*H02G 11/00* (2006.01)
*E21B 15/00* (2006.01)

(52) U.S. Cl.
CPC ............ *E21B 15/003* (2013.01); *E21B 15/00* (2013.01); *H02G 3/0456* (2013.01); *H02G 11/006* (2013.01)

(58) Field of Classification Search
CPC ..... E21B 15/003; E21B 15/00; H02G 11/006; H02G 3/0456
See application file for complete search history.

(56) References Cited

U.S. PATENT DOCUMENTS

| | | | | |
|---|---|---|---|---|
| 3,157,376 A | * | 11/1964 | Merker | B66C 13/12 191/12 C |
| 3,161,205 A | * | 12/1964 | Merker | B66C 13/12 137/355.17 |
| 3,833,774 A | * | 9/1974 | Mills | B66C 13/12 137/355.16 |
| 3,994,373 A | * | 11/1976 | Loos | F16G 13/16 191/12 C |
| 4,129,277 A | * | 12/1978 | Tenniswood | H02G 11/006 191/12 C |
| 4,232,845 A | * | 11/1980 | Turner | F16L 3/26 174/101 |

(Continued)

FOREIGN PATENT DOCUMENTS

| | | | | |
|---|---|---|---|---|
| KR | WO 2015026036 A1 | * | 2/2015 | H02G 1/06 |
| KR | WO 2015026037 A1 | * | 2/2015 | H02G 1/06 |

*Primary Examiner* — Rodney Mintz
(74) *Attorney, Agent, or Firm* — Patterson & Sheridan, L.L.P.

(57) ABSTRACT

Embodiments of the disclosure generally relate to a cable management system for use in the petrochemical industry. In one embodiment, a cable management system is provided. The cable management system includes an arm assembly coupled to a base that is movable relative to a track structure, wherein the arm assembly includes a first end to couple to a movable platform that moves the arm assembly during movement of the movable platform, and a second end of the arm assembly is coupled to the base and is movable relative to the base during movement of the movable platform.

20 Claims, 9 Drawing Sheets

(56) References Cited

U.S. PATENT DOCUMENTS

| | | | | |
|---|---|---|---|---|
| 4,391,297 A * | 7/1983 | Knight | | E21B 43/26 137/615 |
| 4,462,565 A * | 7/1984 | Johnson | | F16L 3/015 191/12 C |
| 4,474,213 A * | 10/1984 | Jameson | | E21B 43/26 137/615 |
| 4,600,817 A * | 7/1986 | Hackenberg | | H02G 11/006 191/12 C |
| 5,649,415 A * | 7/1997 | Pea | | F16G 13/16 191/12 C |
| 6,913,097 B1 * | 7/2005 | Orr | | E21B 15/00 175/162 |
| 7,234,292 B1 * | 6/2007 | O'Rourke | | F16G 13/16 248/49 |
| 7,234,896 B2 * | 6/2007 | Donnally | | E21B 19/084 405/195.1 |
| 7,310,935 B2 * | 12/2007 | Worms | | F16G 13/16 248/49 |
| 7,654,398 B2 * | 2/2010 | Bridges | | H05K 7/1491 211/26 |
| 7,832,974 B2 * | 11/2010 | Fikowski | | E21B 19/155 414/22.54 |
| 8,820,499 B2 * | 9/2014 | Wells, Sr. | | H02G 1/06 104/89 |
| 8,869,961 B2 * | 10/2014 | Wells, Sr. | | H02G 1/06 104/89 |
| 9,151,412 B2 * | 10/2015 | Trevithick | | E21B 15/00 |
| 9,441,760 B2 * | 9/2016 | Wells, Sr. | | E21B 19/08 |
| 2001/0023914 A1 * | 9/2001 | Oddsen, Jr. | | F16M 11/04 248/274.1 |
| 2004/0079711 A1 * | 4/2004 | Hartman | | H05K 7/1491 211/26 |
| 2006/0078406 A1 * | 4/2006 | Donnally | | E21B 19/084 414/22.62 |
| 2006/0219144 A1 * | 10/2006 | Phelan | | B66F 3/06 114/90 |
| 2006/0289193 A1 * | 12/2006 | Herring | | H05K 7/1491 174/72 A |
| 2009/0014601 A1 * | 1/2009 | Chen | | H05K 7/1491 248/70 |
| 2009/0065658 A1 * | 3/2009 | Chen | | H02G 3/0456 248/70 |
| 2009/0196711 A1 * | 8/2009 | Gerber | | E21B 19/15 414/22.58 |
| 2009/0200856 A1 | 8/2009 | Chehade et al. | | |
| 2010/0181440 A1 * | 7/2010 | Larsen | | F16L 3/015 248/68.1 |
| 2011/0100679 A1 * | 5/2011 | Biggadike | | H02G 11/00 174/135 |
| 2012/0031721 A1 * | 2/2012 | Glueckhardt | | B63J 3/04 191/12 R |
| 2012/0090870 A1 * | 4/2012 | Jaeker | | H02G 11/00 174/68.3 |
| 2013/0050963 A1 * | 2/2013 | Zhou | | H02G 11/006 361/752 |
| 2013/0077219 A1 * | 3/2013 | Fu | | H02G 11/006 361/679.02 |
| 2013/0277508 A1 * | 10/2013 | Trevithick | | E21B 15/00 248/49 |
| 2013/0315676 A1 * | 11/2013 | Orgeron | | E21B 15/003 405/184.4 |
| 2014/0090576 A1 * | 4/2014 | Wells, Sr. | | H02G 1/06 105/238.1 |
| 2014/0110538 A1 * | 4/2014 | Wells, Sr. | | H02G 1/06 248/55 |
| 2014/0224944 A1 * | 8/2014 | Royer | | E21B 15/00 248/70 |
| 2015/0069183 A1 * | 3/2015 | Schlipf | | B64C 9/22 244/129.1 |
| 2015/0271945 A1 * | 9/2015 | Chen | | H05K 7/1491 248/70 |
| 2015/0280407 A1 * | 10/2015 | O'Brien | | H02G 3/0475 174/99 R |
| 2015/0303665 A1 * | 10/2015 | Kemper | | F16G 13/16 248/55 |
| 2015/0322733 A1 * | 11/2015 | Wells, Sr. | | E21B 19/08 104/89 |
| 2015/0376962 A1 * | 12/2015 | Kos | | E21B 19/155 414/22.54 |

\* cited by examiner

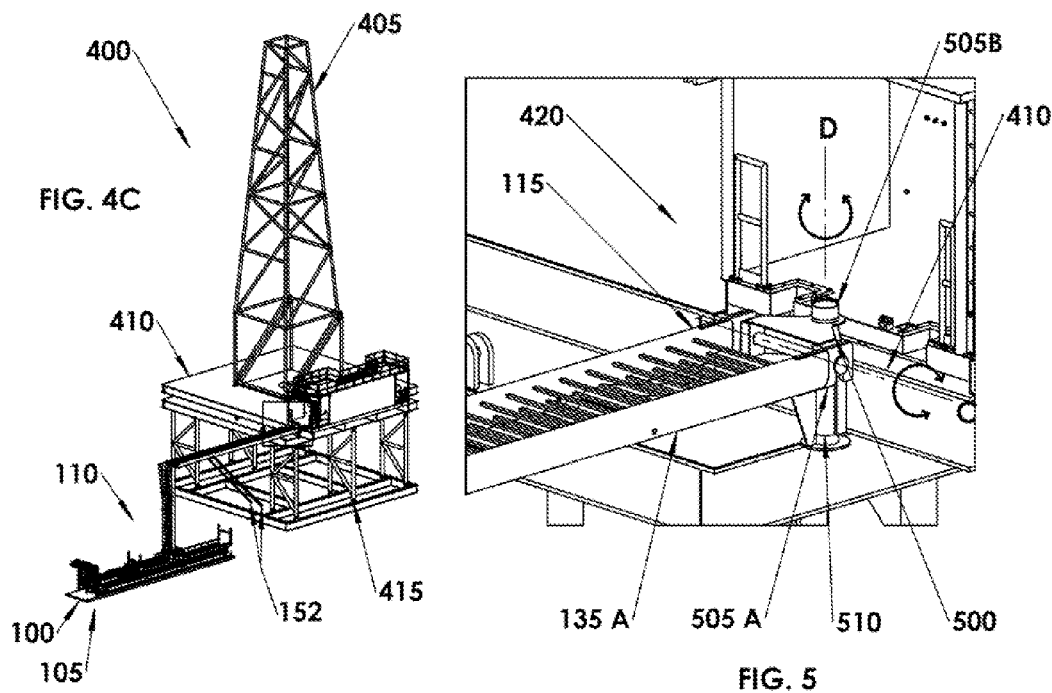
FIG. 4C
FIG. 5
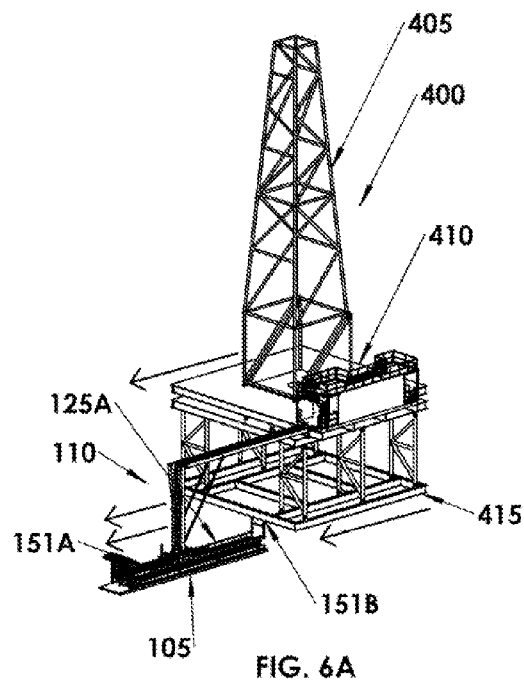
FIG. 6A

CABLE MANAGEMENT SYSTEM

CROSS-REFERENCE TO RELATED APPLICATIONS

This application claims benefit of U.S. Provisional Patent Application Ser. No. 61/887,051, filed Oct. 4, 2013, which application is hereby incorporated by reference herein.

BACKGROUND

Field

Embodiments of the disclosure generally relate to a cable management system for use in the petrochemical industry.

Description of the Related Art

Cable management systems include cable trays, drag chains, as well as other equipment, that support power cables, telecommunication lines, fluid lines, and other supporting equipment for other systems. These cable management systems are utilized in many industries, including the petrochemical exploration industry, to provide protected storage of conduits for electrical, telecommunication, and other supporting equipment.

In the petrochemical industry, a cable management system may provide protected movement of the various conduits and cables during erection of a drilling rig. The cable management system may handle cabling traveling from a power source, mud pumps, and other rig components, to the drill floor. During erection of the rig, the mast and the drill floor are raised using a crane (or other lifting system). When a crane is used, the raising of the mast and the drill floor are typically done in separate lifting operations (due to weight considerations). After the drill floor is raised, the cable management system is raised in a subsequent (i.e., third) lifting operation in order to attach the cable management system to the drill floor.

The multiple lifting operations are time-consuming and costly. Additionally, multiple lifting operations increase the risk of injury to operators. Further, drilling rigs may be moved after operations are completed at one well, and moved to another location, in a process known as "skidding" or "walking". During these movement processes, the mast and/or drill floor may be in an erected position. However, the cable management system is typically detached from the drill floor prior to movement and reattached after movement is completed. This detachment and reattachment requires use of a crane, which increases costs and of the drilling operation due to the cost of the crane, the time for detachment and reattachment, as well as increases the risk of injury.

What is needed is a cable management system that minimizes lifting operations in a drilling operation.

SUMMARY

Embodiments of the disclosure generally relate to a cable management system for use in the petrochemical industry.

In one embodiment, a cable management system is provided. The cable management system includes an arm assembly coupled to a base having a base structure, the arm assembly being linearly movable relative to the track structure, wherein the arm assembly includes a first end of the arm assembly that couples to a movable platform and moves the arm assembly during movement of the movable platform, and a second end of the arm assembly is coupled to the base and is movable relative to the base during movement of the movable platform.

In another embodiment, a cable management system is provided. The cable management system includes an arm assembly coupled to a base, the arm assembly comprising a first arm member and a second arm member that is pivotably coupled to the first arm member, wherein the first arm member includes a first end of the arm assembly that couples with a movable platform and the second arm member includes a second end of the arm assembly coupled to the movable base, and wherein the movable base is coupled to a track structure and moves relative to the track structure during movement of the movable platform.

In another embodiment, a method for erecting a drilling rig is provided. The method includes erecting a mast of a drilling rig and securing the mast in an upright position on a drill floor, coupling a first arm member of a cable management system to the drill floor, and raising the first arm member while raising the drill floor, wherein, during the raising the first arm member pivots in a first axis relative to a second arm member of the cable management system, the second arm member is pivotable in a second axis relative to a base of the cable management system, the second axis being substantially perpendicular to the first axis, and the first arm member is linearly movable relative to the base.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4C is an isometric view of the rig of FIGS. 4A and 4B having the rig floor raised.

FIG. 5 is an isometric view of one embodiment of a coupling member utilized to secure the arm assembly of the cable management system to the rig floor.

FIGS. 6A-6D are isometric views showing aspects of the movement of the cable management system when the rig is moved.

Figure 1A:
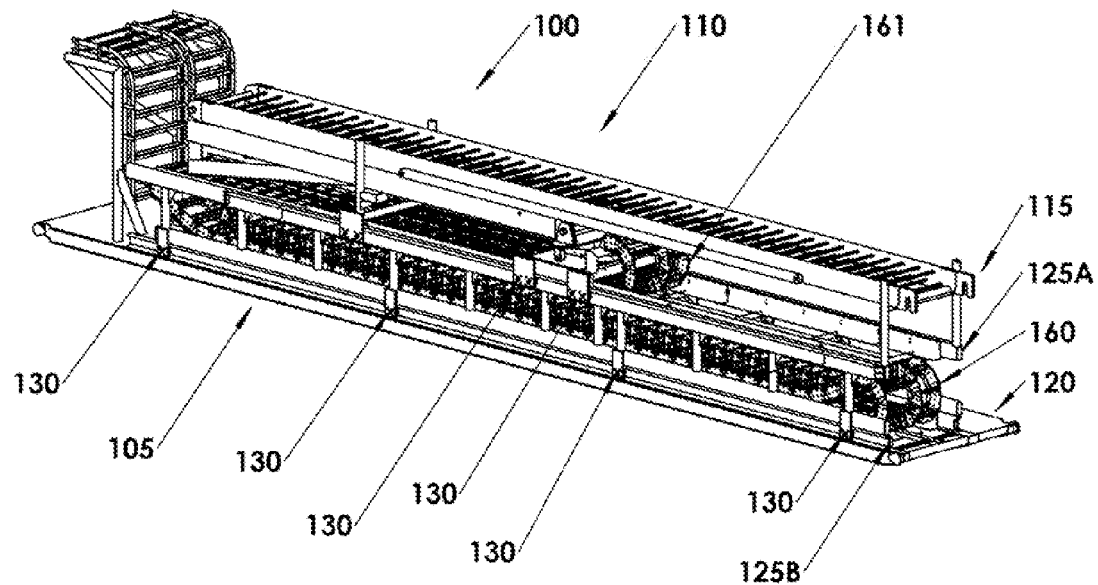
FIG. 1A is an isometric view of one embodiment of a cable management system.

To facilitate understanding, identical reference numerals have been used, wherever possible, to designate identical elements that are common to the figures. It is contemplated that elements and/or process steps of one embodiment may be beneficially incorporated in other embodiments without additional recitation.

DETAILED DESCRIPTION

Embodiments of the disclosure generally relate to an extendable and/or expandable cable management system that may be used with drilling rigs having raised platforms. In one embodiment, the cable management system handles cabling traveling from a power source, a fluid source, a telecommunications hub, or other source, station or substation adjacent a drilling rig. In one example, the cable management system handles cabling and/or conduits from a silicon-controlled rectifier (SCR) house, mud pumps, and other rig components, to the drill floor. The system's rapid deployment design can reduce setup time from several days down to just a few hours. The cable management system may include a skidding drag chain that provides smooth and organized operation. The cable management system may include a pivoting support arm that attaches to the drill floor. The pivoting support arm may pivot relative to a base member (typically supported on the ground). The pivoting support arm may rotate relative to the base member within about a 120 degree angle. The base member may comprise a track structure allowing linear movement of the pivoting support arm relative to the base member. The pivoting support arm may also include a first arm member coupled to the base member and a second arm member coupled to the first arm member, wherein the second arm member is pivotable relative to the first arm member. The second arm member is also capable of coupling to the drill floor. The pivoting support arm may also comprise a swing arm that moves in multiple planes relative to the base member.

FIG. 1A is an isometric view of one embodiment of a cable management system 100. The cable management system 100 includes a base 105, which may comprise a skid structure that is movable relative to a surface, such as the ground. The cable management system 100 also includes an arm assembly 110 that is disposed on the base 105. The arm assembly 110 is shown in FIG. 1A in a folded position for storage and/or transport. However, the arm assembly 110 is movable relative to the base 105 and is extendable when a first end 115 of the arm assembly 110 is coupled to a lifting member (not shown). The lifting member may be a crane or a winch, or a movable support member, such as a drilling rig platform. Each of the base 105 and the arm assembly 110 comprise multiple rung structures which may function to support a cable tray(s) or a drag chain shown as a first drag chain 160 and a second drag chain 161. The first drag chain 160 may include a length that is greater than a length of the second drag chain 161. In some embodiments, the first drag chain 160 is at least twice as long as the second drag chain 161. In one embodiment, the first drag chain 160 includes a length of about one hundred feet while the second drag chain 161 includes a length of about thirty feet. In some embodiments, the arm assembly 110 does not include a drag chain and any cabling (not shown) is supported and/or secured by rungs of the arm assembly 110.

The base 105 includes a track structure 120, which may include a first track mechanism 125A and a second track mechanism 125B. Each of the first track mechanism 125A and the second track mechanism 125B include a roller assembly, such as rollers 130, that interface and move within a channel disposed in sides of the track structure 120. Rollers 130 are also disposed on the back side of the track structure 120 which is not shown in the view of FIG. 1A.

Each of the rollers 130 may be positioned symmetrically on each side of the track structure 120. The first track mechanism 125A and the second track mechanism 125B provide movement of the arm assembly 110 relative to the base 105. One or both of the first track mechanism 125A and the second track mechanism 125B may also move linearly relative to the base 105 such that one or both of the first track mechanism 125A and the second track mechanism 125B may extend laterally from the base 105.

Figure 1B:
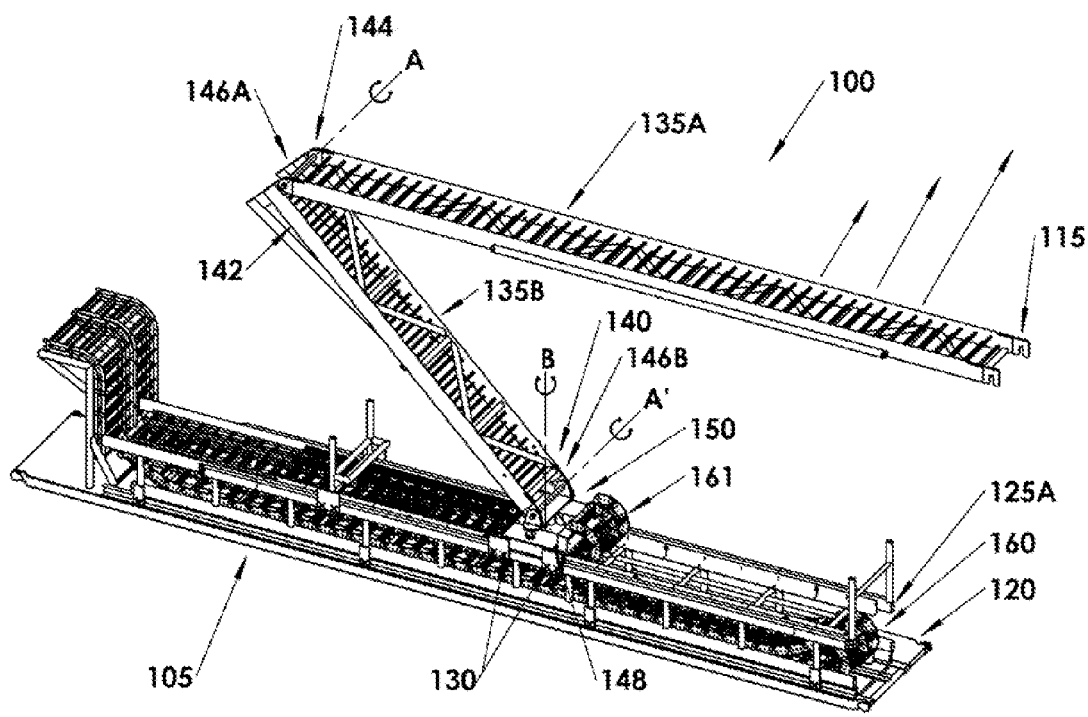
FIG. 1B is an isometric view of the cable management system of FIG. 1A with the arm assembly in a partially extended or unfolded position.

FIG. 1B is an isometric view of the cable management system 100 of FIG. 1A with the arm assembly 110 in a partially extended or unfolded position. The arm assembly 110 includes a first arm 135A and a second arm 135B. The first arm 135A includes the first end 115 (that is coupled to a lifting member (not shown)) and the second arm 135B includes a second end 140 that is coupled to the base 105. The second arm 135B also includes a second end 142 that couples to a first end 144 of the first arm 135A. The first end 144 of the first arm 135A is coupled to the second end 142 of the second arm 135B at a first pivot point 146A.

The second end 140 of the second arm 135B is coupled to the base 105, specifically the track structure 120, by a movable base 148. The second end 140 of the second arm 135B may be hingedly coupled to the movable base 148 at a second pivot point 146B to facilitate angular displacement of the second arm 135B relative to the movable base 148. Movement of the arm assembly 110 is also facilitated by the movable base 148, which is coupled to the track structure 120. Specifically, the movable base 148 is coupled to the first track mechanism 125A and may move linearly relative to the base 105 thereon. Additionally, pivoting movement of the arm assembly 110 is provided by a central pivot mechanism 150 disposed between the movable base 148 and the second end 140 of the second arm 135B. During movement of the arm assembly 110, the pivot point 146A facilitates pivoting between the first end 144 of the first arm 135A and the second end 142 of the second arm 135B about a first axis A. Additionally, the second pivot point 146B facilitates pivoting between the second end 140 and the movable base 148 about a second axis A'. The first axis A and the second axis A' may be substantially parallel. Further, if the first end 115 of the arm assembly 110 is required to swivel during movement of the arm assembly 110, pivoting of the arm assembly 110 is provided by the central pivot mechanism 150 in a third axis B. The third axis B may be substantially orthogonal to one or both of the first axis A and the second axis A'. The pivoting provided by the central pivot mechanism 150 minimizes stress on the arm assembly 110 and may also facilitate quicker set-up (and/or takedown) since the entirety of the cable management system 100 will not need to be moved to position the arm assembly 110 (relative to another structure).

Figure 1C:
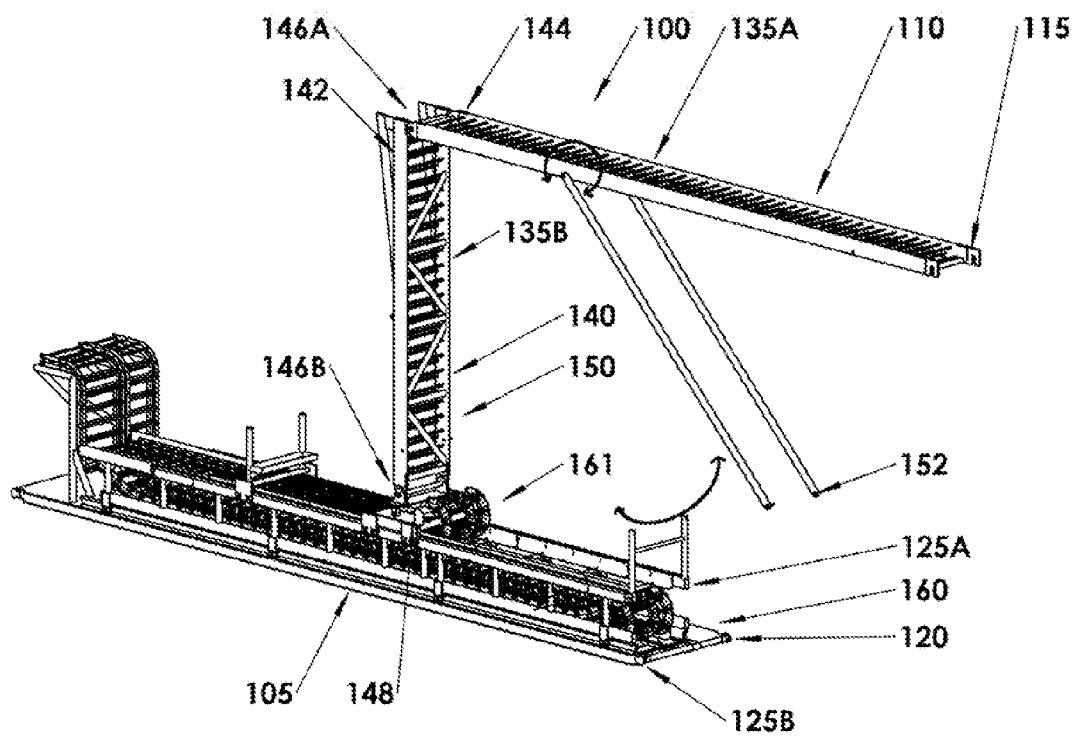
FIGS. 1C and 1D are isometric views of the cable management system of FIG. 1B with the arm assembly in a fully extended or unfolded position.
Figure 1D:
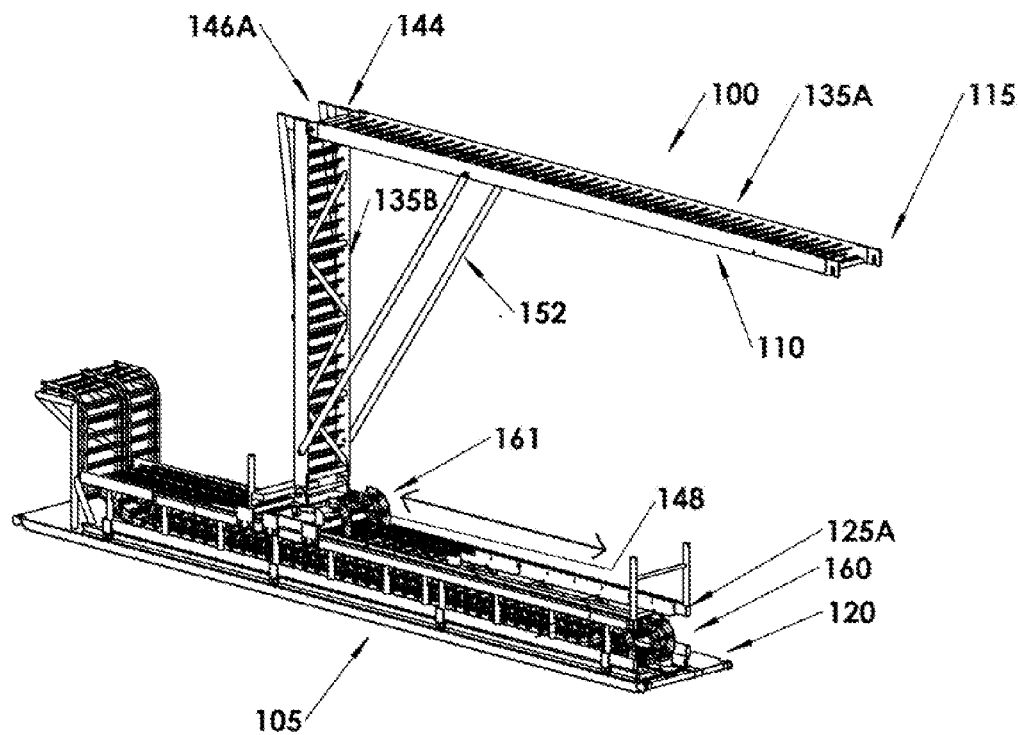

FIGS. 1C and 1D are isometric views of the cable management system 100 of FIG. 1B with the arm assembly 110 in a fully extended or unfolded position. In this Figure, the first arm 135A may be substantially perpendicular to the second arm 135B. Additionally, the first arm 135A may be substantially parallel to one of both of the track structure 120 and the base 105. Also shown is a brace structure 152 that includes at least one bracing member. The brace structure 152 may be hingedly coupled to the first arm 135A. When the arm assembly 110 is extended, the brace structure 152 is coupled to the second arm 135B to prevent movement of the first arm 135A relative to the second arm 135B. Additionally, an arrow in FIG. 1D shows the direction of movement of the arm assembly 110 relative to the base 105 provided by the movable base 148.

Figure 1E:
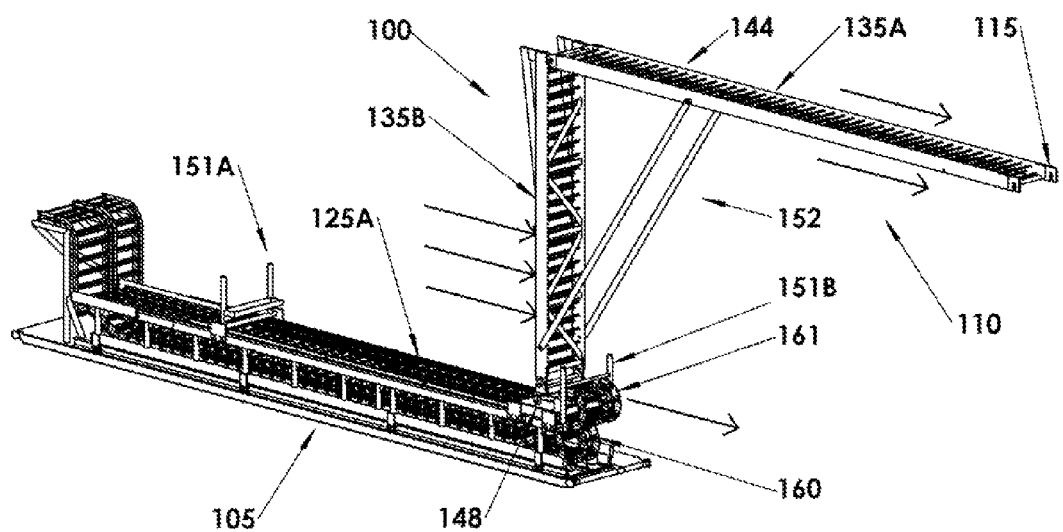
FIGS. 1E and 1F are isometric views of the cable management system of FIG. 1D showing the range of movement of the arm assembly relative to the base.
Figure 1F:
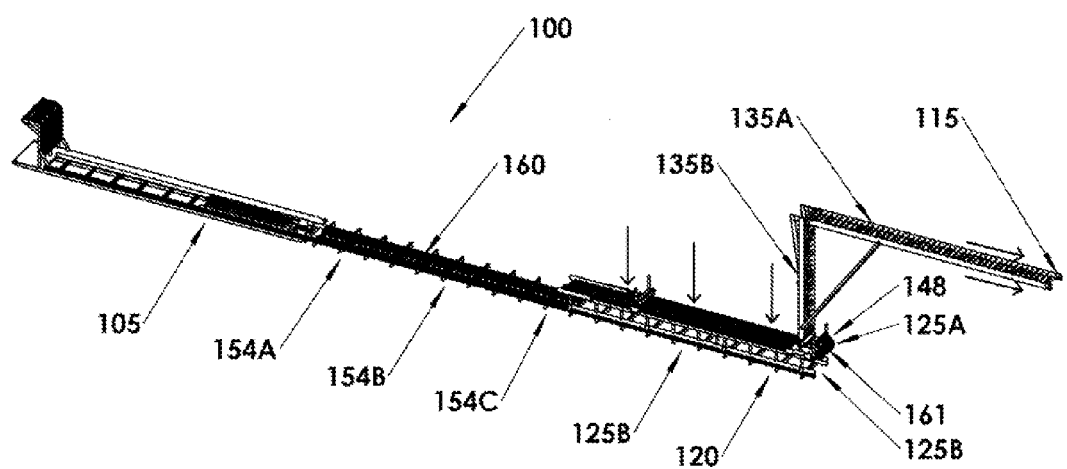

FIGS. 1E and 1F are isometric views of the cable management system 100 of FIG. 1D showing the range of movement of the arm assembly 110 relative to the base 105. Movement of the movable base 148 on the first track mechanism 125A may be limited to a travel range provided between stops 151A and 151B. The range of movement of the arm assembly 110 on the first track mechanism 125A is about twenty eight feet in one embodiment. However, the length of the first track mechanism 125A and the positioning of the stops 151A, 151B may be provided to be greater than or less than about 28 feet. Linear movement of the arm assembly 110 may be extended by adding additional extension members 154A-154C. Each of the extension members 154A-154C may be secured to each other, and to the base 105 and the first track mechanism 125A using fasteners, to provide additional linear movement of the arm assembly 110. Each of the extension members 154A-154C may contain a channel that interfaces with the rollers 130 similar to the operation of the second track mechanism 125B described in FIG. 1A. Depending on the number and/or length of each of the extension members 154A-154C, movement of the arm assembly 110 to about an additional one hundred feet from the base 105 may be realized. The first drag chain 160 is sized to permit the linear movement of the arm assembly 110 as described above and is configured to couple to the extension members 154A-154C.

Figure 2A:
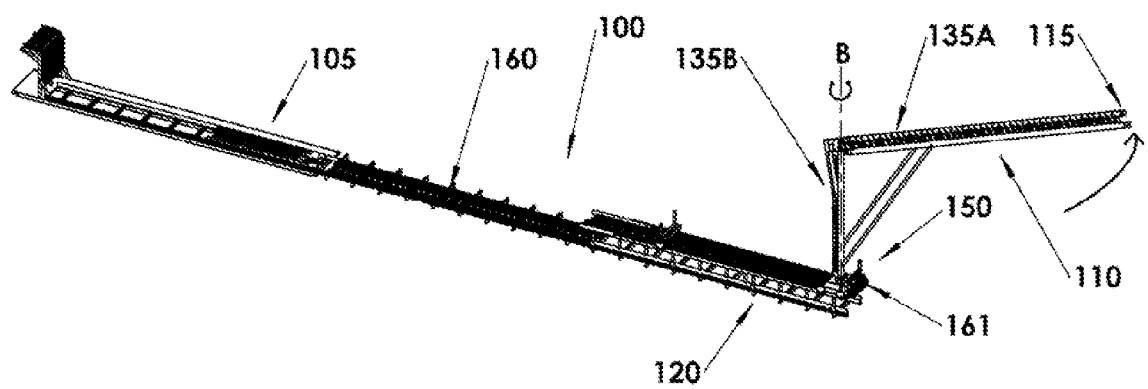
FIGS. 2A and 2B are isometric views of the cable management system of FIG. 1D showing the rotational movement of the arm assembly.
Figure 2B:
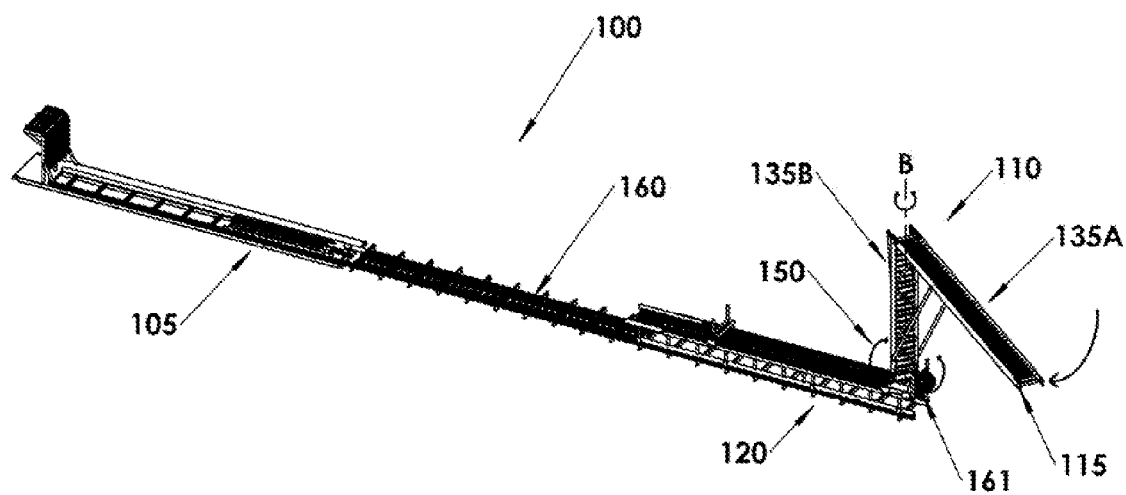

FIGS. 2A and 2B are isometric views of the cable management system 100 of FIG. 1D showing the rotational range of movement of the arm assembly 110. Rotation at the central pivot mechanism 150 about the third axis B provides swiveling of the arm assembly 110 relative to the track structure 120. The swivel range of the central pivot mechanism 150 may be a full 360 degrees, or may be limited to about 120 degrees in some embodiments. The first end 115 of the first arm 135A may be moved about 30 feet both ways about the third axis B, in one embodiment.

Figure 3:
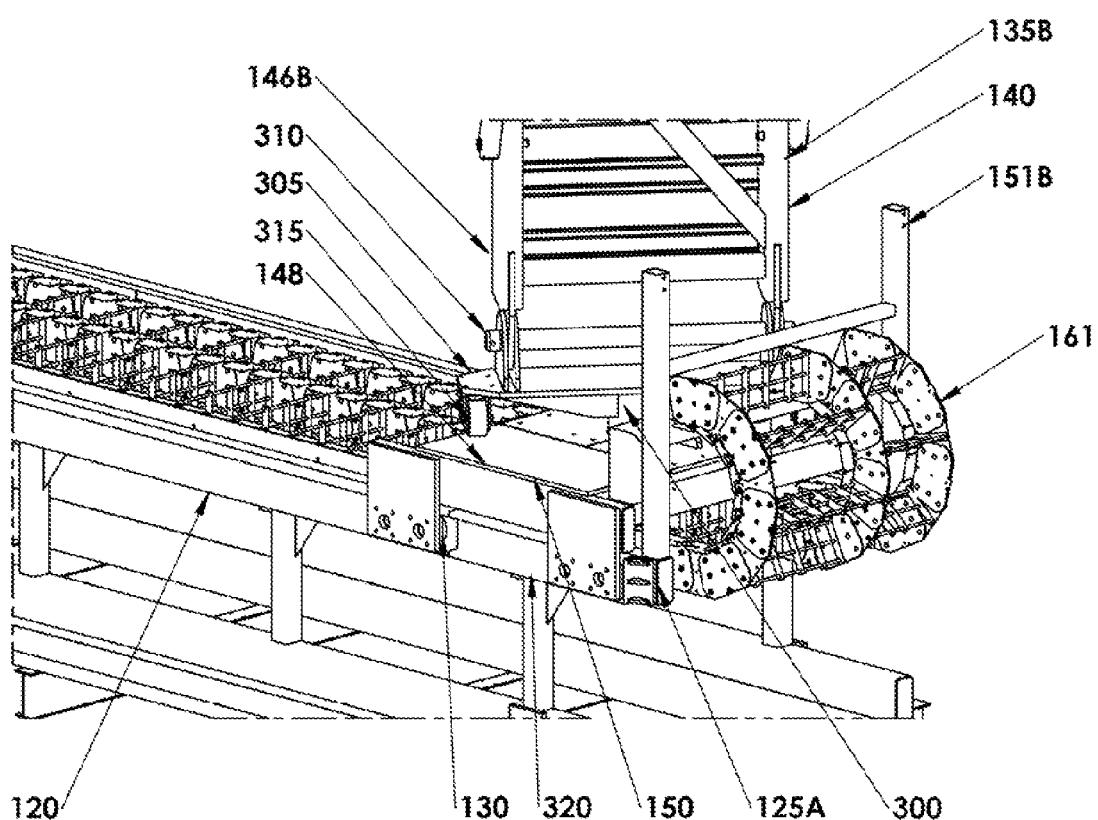
FIG. 3 is an isometric view of one embodiment of the central pivot mechanism.

FIG. 3 is an isometric view of one embodiment of the central pivot mechanism 150. The central pivot mechanism 150 includes a socket 300 secured centrally on the movable base 148. The socket 300 may be a tubular member, such as a pipe, that is welded or otherwise fixed to the movable base 148. The socket 300 receives a pin member (not shown) which is secured to a base plate 305 that is part of the second end 140 of the second arm 135B. The pin member may be a tubular member, such as a pipe, or a solid rod, that is welded or otherwise fixed to the base plate 305. Also shown in FIG. 3 is a hinge member 310 that facilitates pivoting of the second arm 135B. The hinge member 310 may be a pin, a pipe or a rod that is hingedly coupled between the base plate 305 and the second end 140 of the second arm 135B that facilitates movement about the second axis A' as described in FIG. 1B.

Additionally, stabilizing members 315 are shown between the base plate 305 and the movable base 148. The stabilizing members 315 may be disposed outwardly from the socket 300 and roll on the surface of the movable base 148 to provide stability for the arm assembly 110. The stabilizing members 315 may comprise wheels or casters. Also shown in FIG. 3 is one side of a channel 320 of the first track mechanism 125A where the rollers 130 may move.

Figure 4A:
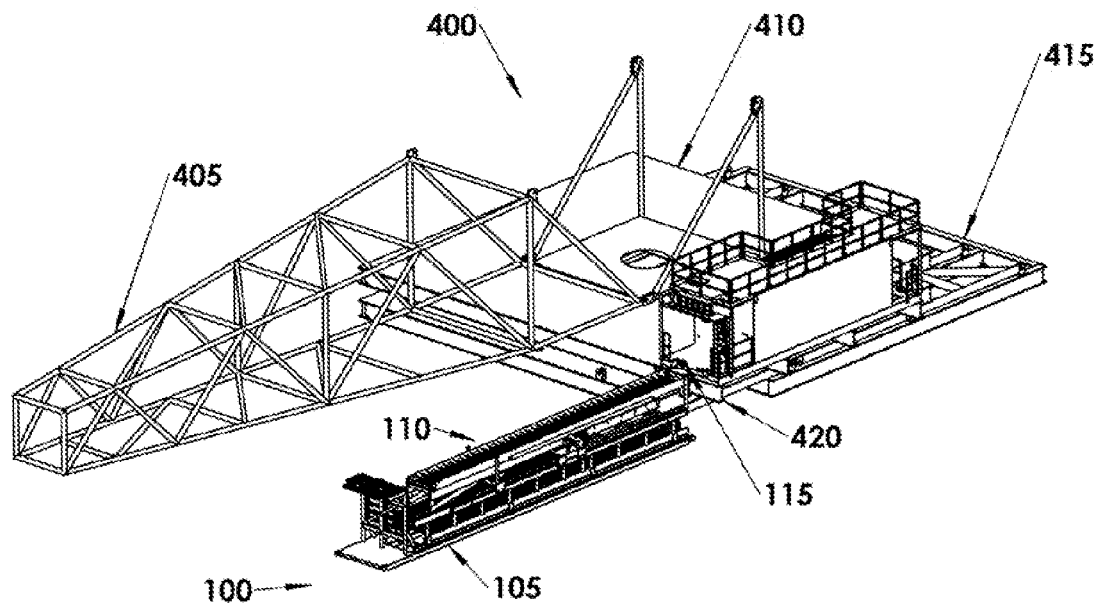
FIGS. 4A and 4B are isometric views showing the cable management system proximate to a rig.
Figure 4B:
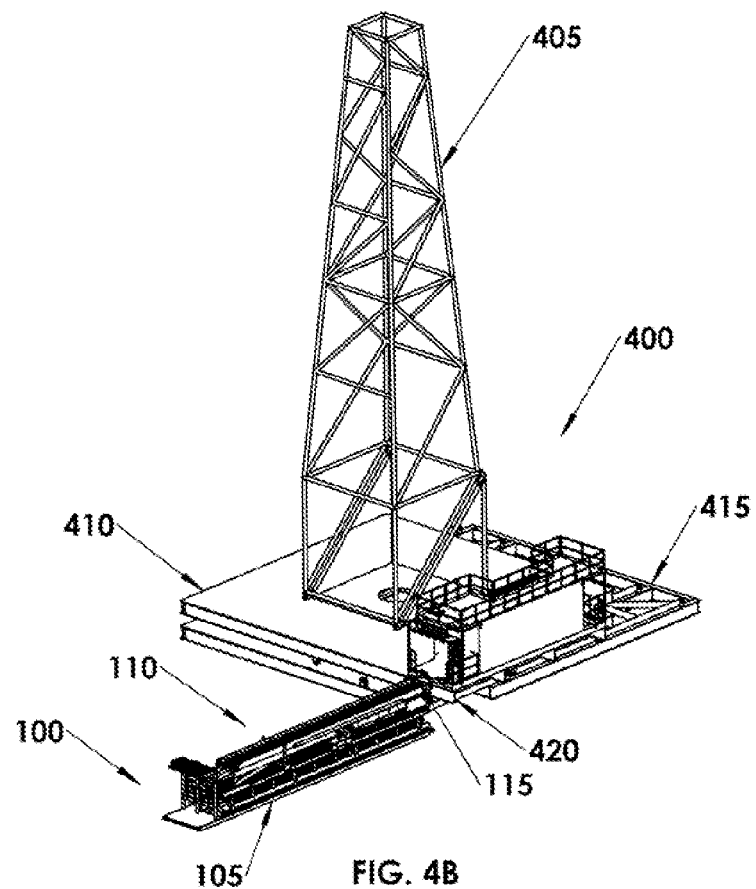

FIGS. 4A and 4B are isometric views showing the cable management system 100 proximate a rig 400. The rig 400 may be a drilling rig or a workover rig. The rig 400 includes a mast 405, a rig floor 410, and a substructure 415. During the installation process of the rig 400, a crane (not shown) is used to erect the mast 405 to a position shown in FIG. 4B. In the position shown in FIG. 4B, the mast 405 is pinned before the rig floor 410 is raised. At some time prior to the rig floor 410 being raised relative to the substructure 415, the first end 115 of the first arm may be coupled to the rig floor 410 by a coupling assembly 420. The coupling assembly 420 may include one or more pins (not shown).

FIG. 4C is an isometric view of the rig 400 having the rig floor 410 raised by a crane (not shown). In this raising operation, the arm assembly 110 of the cable management system 100 is lifted with the rig floor 410. When the rig floor 410 is spaced-apart from the substructure 415 at a suitable distance, the rig floor 410 is secured (i.e., pinned). Subsequently, the arm assembly 110 may be stabilized by securing the brace structure 152 as shown in FIG. 1D.

FIG. 5 is an isometric view of one embodiment of a coupling assembly 420 utilized to secure the first end 115 of the first arm 135A to the rig floor 410. The coupling assembly 420 may comprise a yoke 500 that is movably secured between the rig floor 410 and the first end 115 of the first arm 135A. The yoke 500 may be secured using one or more pins 505A, 505B. The pin 505A may be used to secure the first end 115 to the yoke 500 and the pin 505B may be used to secure the yoke 500 to the rig floor 410. The pin 505A provides rotation about an axis C thereby preventing stress on, or binding of, the arm assembly 110 during movement of the rig floor 410. The pin 505B may be received in a socket 510 secured to the rig floor 410. The pin 505B provides rotation about an axis D thereby preventing stress on, or binding of, the arm assembly 110 during movement of the rig floor 410. The rotation of axis C is substantially normal to the rotation of axis D. The axis C may be parallel to the second axis A' (shown in FIG. 1B). The axis D may be parallel to the third axis B (shown in FIG. 1B).

Figure 6B:
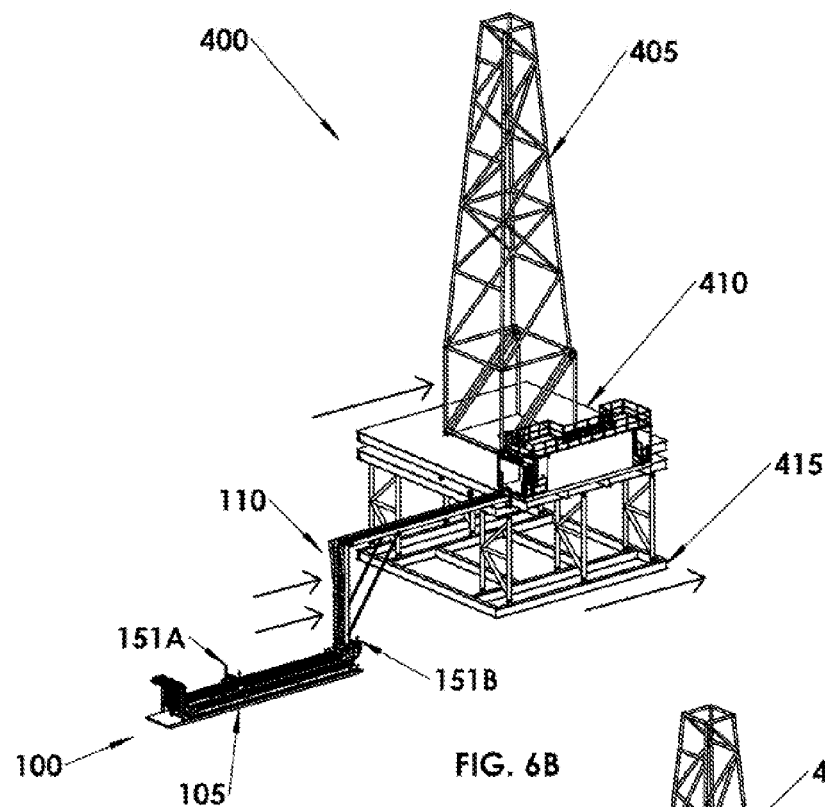

FIGS. 6A-6D are isometric views showing aspects of the movement of the cable management system 100 when the rig 400 is moved (i.e., "skidded" or "walked") from one location to another location. FIGS. 6A and 6B show the rig 400 moving in a first direction (i.e., toward and away) from the base 105, respectively. The arm assembly 110 may move on the first track mechanism 125A between the stops 151A, 151B to allow movement of the rig 400. In one embodiment, the cable management system 100 may accommodate movement of the rig 400 in about a 28 foot range of motion. Using extension members 154A-154C (shown in FIG. 6C, movement of the arm assembly 110 to about an additional one hundred feet from the base 105 may be provided. Additionally, if the rig 400 moves laterally (i.e., normal to the first direction) before, during, or after the movement shown in FIG. 6A or 6B, the arm assembly 110 may rotate relative to the base 105 (about the third axis B (FIG. 1B)) to prevent binding of the arm assembly 110. While not shown in FIGS. 6A-6C, rotation about axis D provided by the coupling assembly 420 as described in FIG. 5 may also be provided to prevent binding of the arm assembly 110.

Figure 6C:
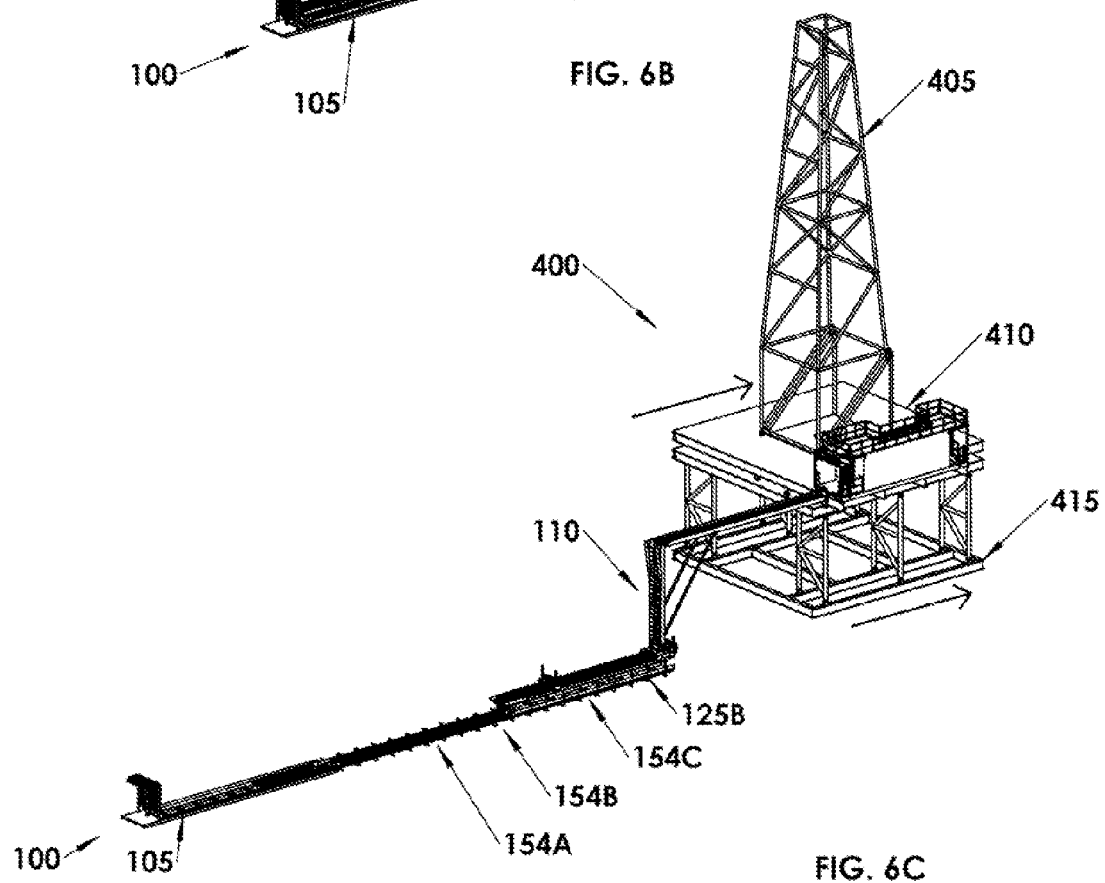
Figure 6D:
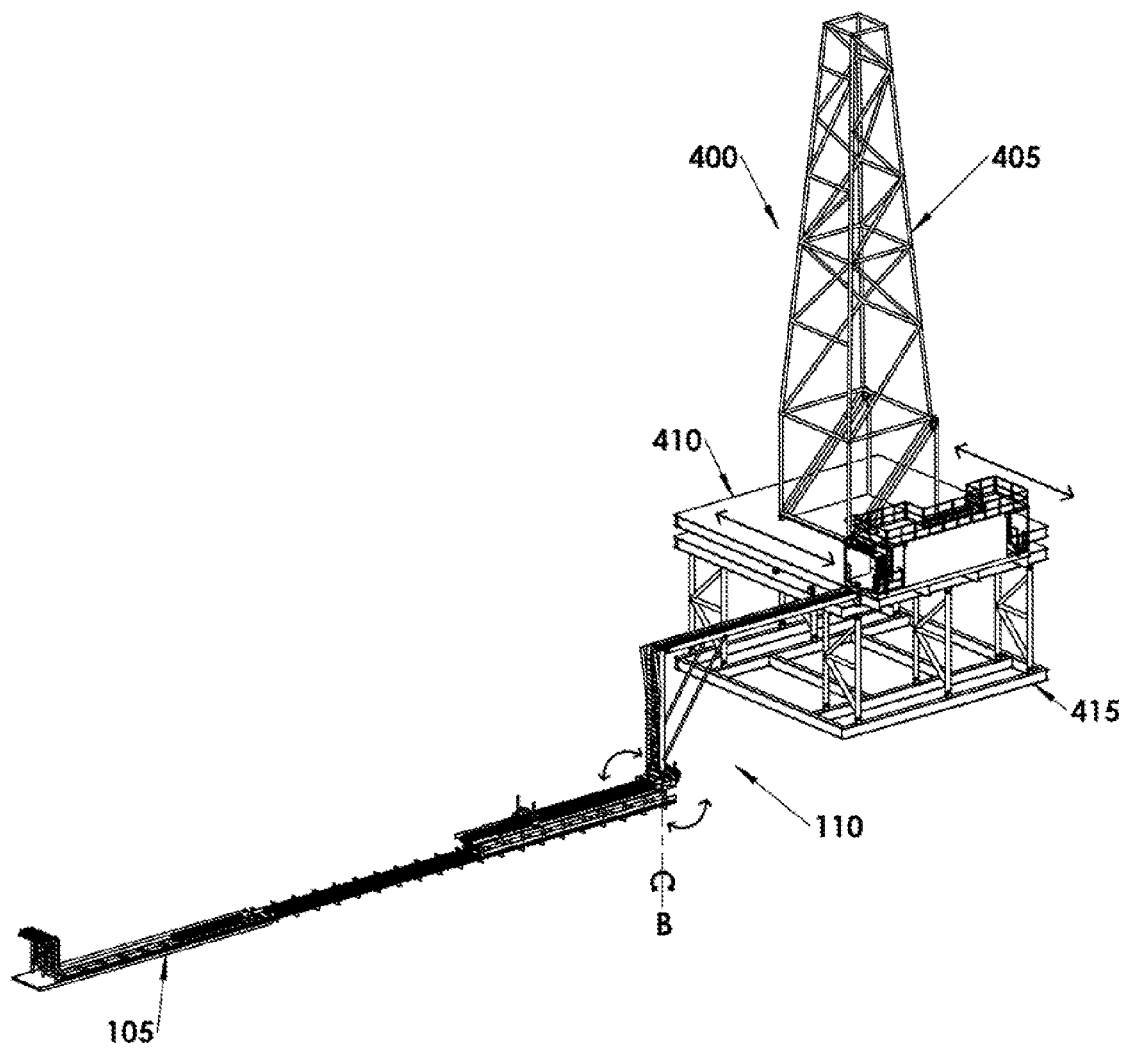

FIG. 6C shows movement of the rig 400 away from the base 105 of the cable management system 100. Additional extension members 154A-154C may be utilized to extend the movement range of the arm assembly 110. Additionally, if the rig 400 moves laterally before, during, or after the movement shown in FIG. 6C, the arm assembly 110 may rotate relative to the base 105 about the third axis B, as shown in FIG. 6D, to prevent binding of the arm assembly 110. While not shown in FIG. 6D, rotation about axis D provided by the coupling assembly 420 as described in FIG. 5 may also be provided to prevent binding of the arm assembly 110.

While the foregoing is directed to embodiments of the disclosure, other and further embodiments of the disclosure may be devised without departing from the basic scope thereof, and the scope thereof is determined by the claims that follow.

The invention claimed is:

1. A cable management system, comprising:
an arm assembly coupled to a base having a track structure, the arm assembly being linearly movable relative to the track structure, wherein the arm assembly comprises:
a first end that couples to a movable platform and moves the arm assembly during movement of the movable platform; and
a second end that is coupled to the base and is movable relative to the base during movement of the movable platform, wherein the first end of the arm assembly is pivotable in a first axis relative to the second end of the arm assembly, and the second end of the arm assembly is pivotable in a second axis relative to the base, the second axis being substantially perpendicular to the first axis.

2. The system of claim 1, wherein a central pivot point is disposed between the base and the second end of the arm assembly.

3. The system of claim 2, wherein one or more stabilizing members are positioned laterally relative to the central pivot point and between the second end of the arm assembly and the base.

4. The system of claim 3, wherein each of the one or more stabilizing members comprise wheels.

5. A cable management system, comprising:
an arm assembly coupled to a base having a track structure, the arm assembly being linearly movable relative to the track structure, wherein the arm assembly includes a first end of the arm assembly that couples to a movable platform and moves the arm assembly during movement of the movable platform, and a second end of the arm assembly is coupled to the base and is movable relative to the base during movement of the movable platform, and wherein the first end of the arm assembly is pivotable in a first axis relative to the second end of the arm assembly, and the second end of the arm assembly is pivotable in a second axis relative to the base, the second axis being substantially perpendicular to the first axis.

6. The system of claim 5, wherein the base is coupled to the track structure by a linear motion assembly.

7. The system of claim 6, wherein the linear motion assembly comprises a plurality of rollers positioned between the base and a channel aligned with the track structure.

8. The system of claim 5, wherein the arm assembly further comprises a first arm member and a second arm member that is pivotably coupled to the first arm member.

9. The system of claim 8, wherein the first arm member includes the first end that couples with the movable platform and the second arm member includes the second end coupled to the base, and wherein the second arm member remains substantially parallel with a ground surface during movement of the movable platform.

10. The system of claim 5, wherein the base is linearly movable relative to the track structure.

11. The system of claim 10, wherein the arm assembly is rotatable relative to the base.

12. The system of claim 11, wherein a central pivot point is disposed between the base and the second end of the arm assembly, and one or more stabilizing members are positioned laterally relative to the central pivot point and between the second end of the arm assembly and the base.

13. The system of claim 12, wherein each of the one or more stabilizing members comprise wheels.

14. A cable management system, comprising:
an arm assembly coupled to a movable base, the arm assembly comprising a first arm member and a second arm member that is pivotably coupled to the first arm member, wherein the first arm member includes a first end of the arm assembly that couples with a movable platform and the second arm member includes a second end of the arm assembly coupled to the movable base, and wherein the movable base is coupled to a track structure and moves relative to the track structure during movement of the movable platform, and wherein the first end of the arm assembly is pivotable in a first axis relative to the second end of the arm assembly, and the second end of the arm assembly is pivotable in a second axis relative to the track structure, the second axis being substantially perpendicular to the first axis.

15. The system of claim 14, wherein the movable base is coupled to the track structure by a linear motion assembly.

16. The system of claim 15, wherein the linear motion assembly comprises a plurality of rollers positioned between the base and a channel aligned with the track structure.

17. The system of claim 14, wherein the movable base is linearly movable relative to the track structure.

18. The system of claim 17, wherein the arm assembly is rotatable relative to the movable base.

19. The system of claim 18, wherein a central pivot point is disposed between the movable base and the second end of the arm assembly, and one or more stabilizing members are positioned laterally relative to the central pivot point and between the second end of the arm assembly and the movable base.

20. The system of claim 19, wherein each of the one or more stabilizing members comprise wheels.

* * * * *